(12) United States Patent
Shaw et al.

(10) Patent No.: US 7,563,364 B2
(45) Date of Patent: Jul. 21, 2009

(54) CURB INLET FILTER

(76) Inventors: Mark D. Shaw, 196 S. Roscoe Blvd., Ponte Vedra Beach, FL (US) 32092; J. Tad Heyman, 659 Ocean Blvd., Atlantic Beach, FL (US) 32259; Phyl Kimball, 4607 Wadham La., Jacksonville, FL (US) 32210; Laurence M. Bierce, P.O. Box 975, Steinhatchee, FL (US) 32359

( * ) Notice: Subject to any disclaimer, the term of this patent is extended or adjusted under 35 U.S.C. 154(b) by 91 days.

(21) Appl. No.: 12/004,286

(22) Filed: Dec. 20, 2007

(65) Prior Publication Data
US 2008/0156713 A1 Jul. 3, 2008

Related U.S. Application Data

(60) Provisional application No. 60/876,816, filed on Dec. 22, 2006.

(51) Int. Cl.
*E03F 5/14* (2006.01)
(52) U.S. Cl. ............... 210/163; 210/266; 210/282; 210/484; 210/497.01; 404/4
(58) Field of Classification Search ............ 210/163, 210/164, 170.03, 266, 282, 483, 484, 485, 210/497.01; 404/4, 5; 405/43, 45, 70, 72, 405/302.6
See application file for complete search history.

(56) References Cited

U.S. PATENT DOCUMENTS

| | | | | |
|---|---|---|---|---|
| 2,228,529 A | * | 1/1941 | Moeller | ............ 405/70 |
| 2,533,402 A | | 12/1950 | Schmitz | |
| 3,289,847 A | * | 12/1966 | Rothemund | ............ 210/266 |
| 3,730,347 A | * | 5/1973 | Giampalmi et al. | ............ 210/266 |
| 3,859,796 A | * | 1/1975 | Benson | ............ 405/70 |
| 4,251,374 A | * | 2/1981 | Cunningham | ............ 210/282 |
| 4,284,500 A | * | 8/1981 | Keck | ............ 210/497.01 |
| 4,528,097 A | | 7/1985 | Ward | |
| 4,652,173 A | * | 3/1987 | Kallestad | ............ 405/72 |
| 4,720,209 A | | 1/1988 | Iams | |
| 5,279,733 A | * | 1/1994 | Heymans | ............ 210/485 |
| 5,632,888 A | | 5/1997 | Chinn | |
| 6,017,166 A | * | 1/2000 | Mossburg, Jr. | ............ 210/163 |
| 6,214,216 B1 | | 4/2001 | Isaacson | |

(Continued)

Primary Examiner—Christopher Upton
(74) *Attorney, Agent, or Firm*—Thomas C. Saitta

(57) ABSTRACT

A modular curb inlet filter apparatus having an internal axial tube member on which are disposed at least two disc spacers, which in turn support a cylindrical mesh frame member, which in turn supports a tubular filter fabric. Wedge anchors composed preferably of a compressible polymer foam are provided with anchor bores of sufficient diameter to receive the ends of the cylindrical mesh frame member therein, the anchor bores being disposed near the base of the wedge anchors such that the curb inlet filter inlet apparatus will be seated close to surface of the curb inlet base when positioned within the curb inlet. Preferably the wedge anchors are provided with a base scuff plate made of a durable polymer material to prolong their use life. A short silt flap or skirt depends from the filter fabric, the silt flap extending the approximately the length of the curb inlet filter apparatus to seal any gap beneath the curb inlet filter apparatus and the base of the curb inlet. Connector fitting members are provided such that the axial tubes may be connected end-to-end in modular manner to create longer structures.

20 Claims, 2 Drawing Sheets

U.S. PATENT DOCUMENTS

| | | | |
|---|---|---|---|
| 6,274,036 B1 * | 8/2001 | Ellis | 210/164 |
| 6,527,477 B1 | 3/2003 | Allard | |
| 6,695,535 B1 | 2/2004 | Lazes | |
| 6,709,579 B1 | 3/2004 | Singleton et al. | |
| 6,811,708 B2 | 11/2004 | Shaw et al. | |
| 7,455,766 B1 * | 11/2008 | Lewis | 210/163 |
| 2007/0138074 A1 * | 6/2007 | Howard | 210/163 |

* cited by examiner

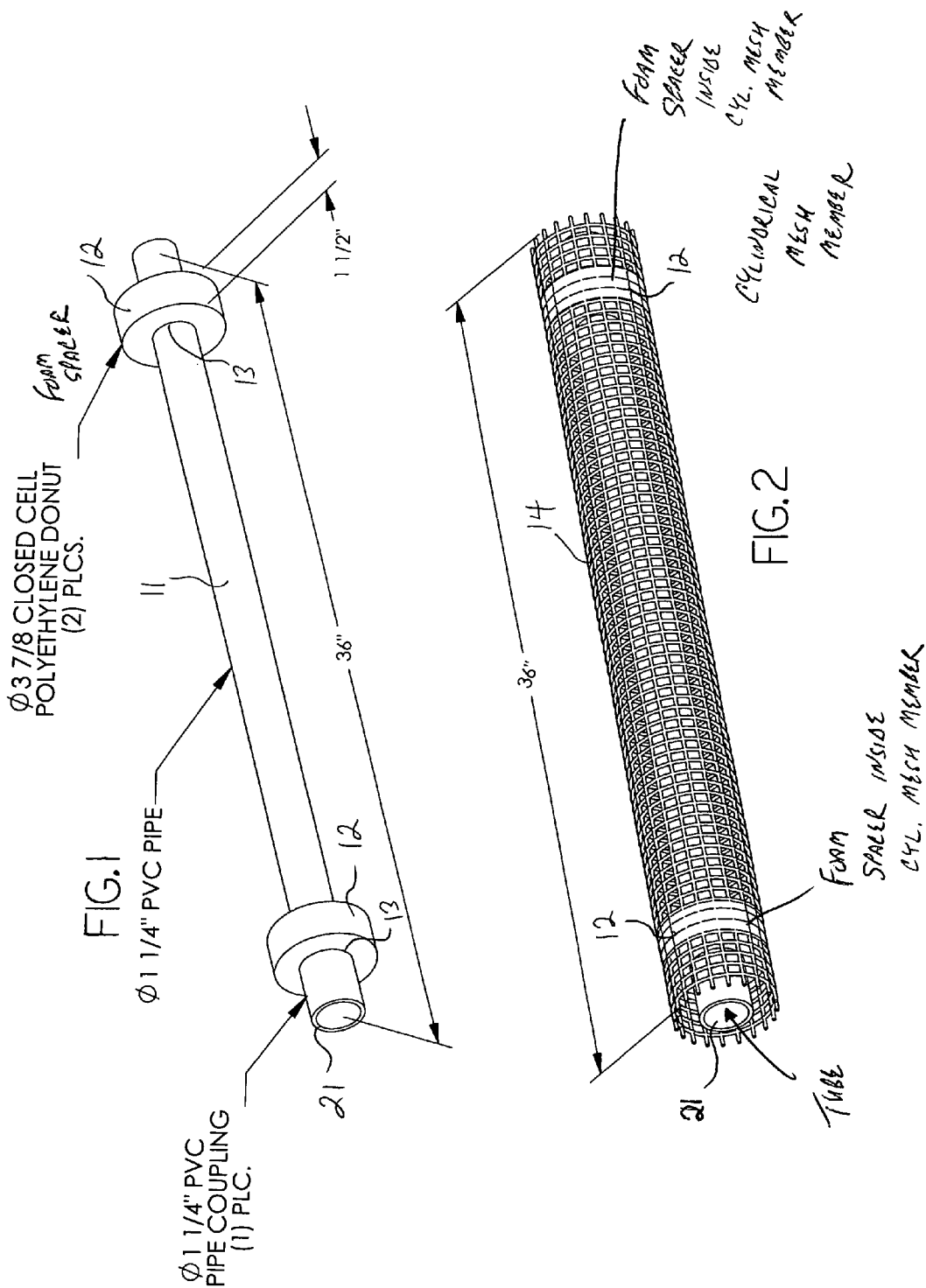

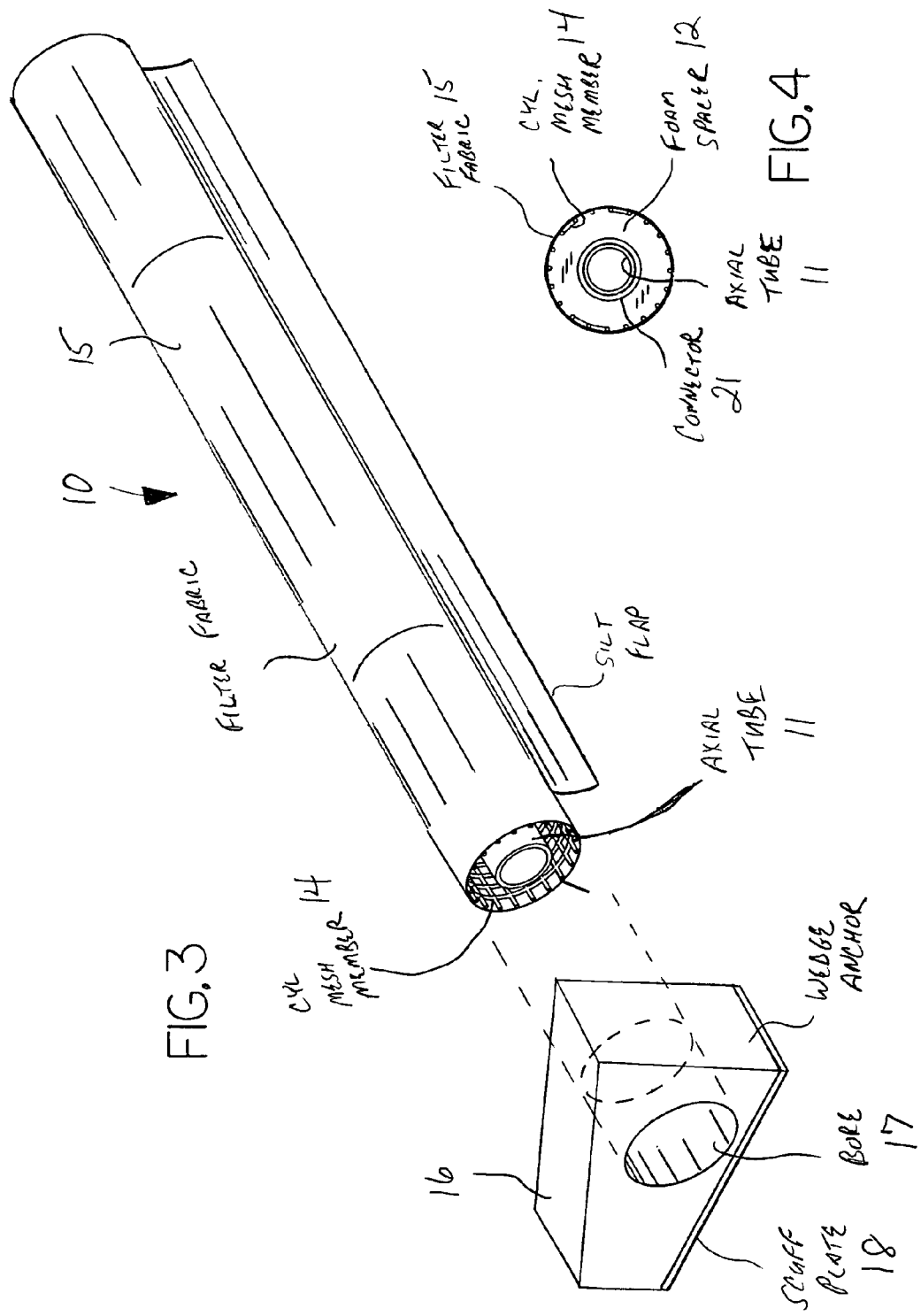

CURB INLET FILTER

This application claims the benefit of U.S. Provisional Patent Application Ser. No. 60/876,816, filed Dec. 22, 2006.

BACKGROUND OF THE INVENTION

The present invention relates generally to the field of filters or dams that are utilized to impede flow through curbside storm water drains, of the type often found adjacent to roads or parking lots. In particular, the present invention relates to an improved curb guard filter that may be advantageously applied to a vertical curbside inlet opening.

Curbside drainage systems are designed to manage rain or other liquid runoff resulting from rainfall, liquid spills, etc., that flow onto streets, parking lots, and other proximate structures and areas. A curbside storm drain typically comprises a substantially vertical orifice several inches in height in the side of a sidewalk curb and often has a grated opening disposed in the surface of the road or paved area in front of the curb drain. The runoff may be inherently toxic, or in the case of rainwater runoff, often picks up and carries various pollutants such as soil, rocks, oils, and other contaminants and is therefore potentially harmful to the downstream natural and artificial waterways that the storm drain system empties into.

In view of the potential for drain system contamination, it is often desirable, and sometimes mandated, that curb side drains be blocked or filtered in some manner to prevent or control the entry of contaminants into the drain system. For example, near construction sites or other area likely to be susceptible to toxic substance spillage, flow into the curb drain must be controlled so that undesirable matter, such as for example dirt, oil, debris, etc., does not enter the storm water drainage system.

Examples of devices which have been developed to preclude or to filter the liquid flow through a curb inlet drain include those disclosed in U.S. Pat. No. 6,214,216 to Isaacson, U.S. Pat. No. 5,632,888 to Chinn et al., U.S. Pat. No. 5,403,474 to Emery, U.S. Pat. No. 6,274,036 to Ellis, and U.S. Pat. No. 5,954,952 to Strawser. For example, Isaacson discloses a catch basin insert or sock filter supported within a grated curb inlet storm drain. Adjustable, spring-loaded rods are inserted into loops on the edges of the catch basin filter and utilized to support the filter on the horizontal plane of the storm drain such that the horizontal support does not depend on the downward gravity force of the grate being applied on all four sides of the filter, or else the grate itself is used to secure the sock filter. A portion of the horizontally disposed filter is vertically extended in an L-shaped manner to provide a vertical filter or dam to prevent debris from passing through the curb inlet. In this configuration, the vertical dam is a single sheet supported on its upper end by an adjustable spring-loaded rod. There is however, no provision for securing the vertical dam at its lower end, and the device is clearly not useable where only a curb inlet with no storm drain is present. Thus, it will be relatively easy for the vertical dam to be moved or distorted out of position by the force of inflowing liquids and debris, and undesirable liquid or debris may readily pass around the vertical dam.

Chinn describes an environmental filter comprising an envelope of filter material that is proportioned to receive a storm drain inlet cover or other internal support device and provide filtration over drain catch basin. A vertical roll filter may be combined with the horizontally disposed envelope filter using straps, weights, pins, hooks, or anchors. Although effective in providing a robust barrier to inflowing particulates and debris, Chinn's utilization of a roll filter fails to provide comprehensive sealing of the vertical curb inlet orifice.

Emery discloses a portable curb inlet sediment filter having a box filter frame and a baffle panel defining a filter chamber and an overflow chamber. While providing a stable and comprehensive coverage of the vertical curb inlet orifice, Emery's box filter is unwieldy and, like Chinn's vertical roll filter, does not form a close seal along the mouth of the orifice.

The drain filter disclosed by Ellis is similar in overall structure and functionality to that shown by Isaacson, including a bag disposed over a horizontal drain portion and a debris dam provided at the upper edge of the back sidewall. Unlike Isaacson, the vertical debris dam depicted by Ellis is not a vertically deployed sheet member and instead comprises a porous cylindrical member that covers the face of a curb inlet slot. Like the roll filter and box filter shown by Chinn and Emery, Ellis's porous cylindrical member is not well-suited for forming a tight seal with the vertical curb drain inlet orifice.

Strawser discloses a stormwater catch basin filter assembly comprising a pair of metal frame elements bounding mesh filters, wherein one of the frames is sized to be co-extensive in area with the horizontal storm grate, and the others frame is sized to be co-extensive in area with the vertical curb inlet orifice. Utilizing rigid and non-adjustable frame elements, Strawser's filter assembly, similar to most of the foregoing described filter/dam devices, fails to provide an effective edge seal around a vertical curb inlet orifice.

Although effective for filtering particulates and some contaminants from entering a storm drain system, the foregoing systems are unnecessarily complex and difficult to implement, requiring the heavy cast metal drainage inlets or grates which is problematic for situations requiring quick selective filtration deployment. It can therefore be appreciated that there exists in the art a need for an improved and simplified curb inlet filter device, and one which is modular in design such that the overall length of the curb inlet filter device can be adjusted as required. The present invention addresses such a need.

SUMMARY OF THE INVENTION

The invention comprises in general a modular curb inlet filter apparatus, whereby either a single member or multiple joined members may be quickly and easily inserted into a curb inlet in order to filter liquids passing into the curb inlet drain and storm system. The curb inlet filter apparatus comprises an internal axial tube member on which are disposed at least two disc spacers, which in turn support a cylindrical mesh frame member, which in turn supports a tubular filter fabric. Wedge anchors composed preferably of a compressible polymer foam are provided with anchor bores of sufficient diameter to receive the ends of the curb inlet filter apparatus therein, the anchor bores being disposed near the base of the wedge anchors such that the curb inlet filter inlet apparatus will be seated close to surface of the curb inlet base when positioned within the curb inlet. Preferably the wedge anchors are provided with a base scuff plate made of a durable polymer material to prolong their use life. A short silt flap or skirt depends from the filter fabric, the silt flap extending the approximately the length of the curb inlet filter apparatus to seal any gap beneath the curb inlet filter apparatus and the base of the curb inlet. Connector fitting members are provided such that the axial tubes may be connected end-to-end in modular manner to create longer structures.

BRIEF DESCRIPTION OF THE DRAWINGS

FIG. 1 is a view of the axial tube and the disc spacers.

FIG. 2 is a view showing the cylindrical mesh frame member mounted onto the disc spacers.

FIG. 3 is a view showing the filter fabric mounted onto the cylindrical mesh frame member and a wedge anchor.

FIG. 4 is an end view of the curb inlet filter apparatus.

DETAILED DESCRIPTION OF THE INVENTION

With reference to the drawings, the invention will now be described in detail with regard for the best mode and the preferred embodiment. In general, the invention is a curb inlet filter apparatus that is adapted to be inserted into a curb inlet opening in order to filter water passing into the curb inlet to remove particulate matter. The apparatus is designed to function in a modular manner, such that multiple filter apparatuses can be joined end-to-end to adjust the overall length.

The curb inlet filter apparatus 10 comprises in combination an axial tube member 11, a plurality of annular or disc-shaped spacer members 12, an elongated cylindrical mesh frame member 14 composed of a relatively rigid material and having relatively large apertures, and a tubular filter fabric 15, comprising in combination filtering assembly, and a plurality of wedge anchor members 16. The axial tube member 11 may be composed of PVC pipe or any material with similar characteristics. The disc spacers 12 are provided with axial bores 13 that receive the axial tube 11, such that the disc spacers 12 may be disposed at various longitudinal locations along the axial tube 11. The disc spacers 12 may be composed of relatively rigid polymer foam or any material with similar characteristics. The cylindrical mesh frame member 14 is then positioned on the disc spacers 12 coaxially with the axial tube 11. The filter fabric 15 is then positioned externally on the cylindrical mesh frame member 14, the filter fabric 15 allowing liquid to pass through the apparatus 10 and into the curb inlet, while preventing passage of particulate matter, such as silt, debris or the like. The ends of the curb filter inlet apparatus 10 are exposed, such that multiple units may be joined in end-to-end relationship by providing sleeve connector fittings 21 to directly join the ends of adjacent axial tubes 11. The connector fittings 21 may also be curved, angled or composed of a non-rigid material to allow for the creation of non-linear assemblies.

The wedge anchors 16 are designed to be forced into the curb inlet opening, and therefore a configuration having diminishing height from front to back is preferred, although other shapes may be utilized provided there is a degree of compressibility in the material of composition. Preferably, a relatively rigid polymer foam is used. The wedge anchors 16 are provided with anchor bores 17 sized to receive therein the filtering assembly such that the wedge anchors 16 are disposed externally to the filter fabric 15 and can be positioned along the length of the assembly as needed, the diameter of the anchor bores 17 being approximately equal to the diameter of the tubular filter fabric 15. When two curb inlet filter assemblies are joined together, the wedge anchor 16 is positioned to cover the gap or junction between the two. The anchor bores 17 are located adjacent or toward the base of the wedge anchors 16, rather than being centered, such that the bottom of the filter fabric 15 and cylindrical mesh frame member 14 will rest at or near the base of the curb inlet. Preferably, the wedge anchors 16 are provided with scuff plates 18 on their bases, the scuff plate 18 being made of a relatively durable polymer or the like to prolong the useful life of the wedge anchors 16.

Also most preferably, the curb inlet filter apparatus 10 is provided with a longitudinal silt flap 22 connected to and extending beneath the filter fabric 15 to cover any gap between the filter fabric 15 and cylindrical mesh frame member 14 and the curb inlet base. The silt flap 22 may be weighted or provided with internal support, but this is not essential for it to function properly.

The construction of the apparatus as set forth above results in the formation of a void between the axial tube member 11 and the cylindrical mesh frame member 13. This void may then be filled partially or fully with alternative filter media, such as particulate matter, gravel or the like to increase the efficiency of the filtering process, or to provide for the filtration of other undesirable material, such as for example the use of an oil absorbent material to capture hydrocarbons and the like, or simply to add weight to the unit.

It is understood that equivalents and substitutions for certain elements described above may be obvious to those skilled in the art, and therefore the true scope and definition of the invention is to be as set forth in the following claims.

We claim:

1. A curb inlet filter apparatus comprising:
   an axial tube member;
   a plurality of disc-shaped spacer members having axial bores to receive said axial tube member, said disc-shaped spacer members positioned on said axial tube member;
   a cylindrical mesh frame member disposed on said disc-shaped spacer members;
   a tubular filter fabric disposed on said cylindrical mesh frame member;
   a plurality of wedge anchor members having anchor bores receiving said tubular filter fabric and said cylindrical mesh frame member, said wedge anchor members composed of a compressible material.

2. The apparatus of claim 1, wherein said wedge anchors further comprise scuff plates.

3. The apparatus of claim 1, further comprising a longitudinal silt flap connected to said tubular filter fabric.

4. The apparatus of claim 3, wherein said silt flap is weighted.

5. The apparatus of claim 1, wherein said axial tube member has exposed ends, and further comprising a sleeve connector fitting disposed on at least one of said exposed ends, whereby the axial tube member of a second curb inlet filter apparatus may be joined to said sleeve connector fitting.

6. The apparatus of claim 5, wherein said sleeve connector fitting is angled.

7. The apparatus of claim 5, wherein said sleeve connector fitting is non-rigid.

8. The apparatus of claim 5, wherein said sleeve connector fitting is curved.

9. The apparatus of claim 1, wherein said axial tube member and said cylindrical mesh frame member define a void, and wherein said void contains alternative filter media.

10. The apparatus of claim 9, wherein said alternative filter media is chosen from the group of filter media consisting of particulate matter, gravel and oil absorbent material.

11. A modular curb inlet filter apparatus comprising a plurality of filtering assemblies, each filtering assembly comprising:
   an axial tube member;
   a plurality of disc-shaped spacer members having axial bores to receive said axial tube member, said disc-shaped spacer members positioned on said axial tube member;

a cylindrical mesh frame member disposed on said disc-shaped spacer members;

a tubular filter fabric disposed on said cylindrical mesh frame member;

at least one wedge anchor member having anchor bores receiving said tubular filter fabric and said cylindrical mesh frame member, said at least one wedge anchor member composed of a compressible material;

said apparatus further comprising at least one sleeve connector fitting; said sleeve connector fitting joining together adjacent filtering assemblies.

12. The apparatus of claim 11, wherein said axial tube members have exposed ends, and wherein said at least one sleeve connector fitting receives said exposed ends of said axial tube members.

13. The apparatus of claim 11, wherein said at least one wedge anchor member further comprises scuff plates.

14. The apparatus of claim 11, further comprising a longitudinal silt flap connected to said tubular filter fabric.

15. The apparatus of claim 14, wherein said silt flap is weighted.

16. The apparatus of claim 11, wherein said sleeve connector fitting is angled.

17. The apparatus of claim 11, wherein said sleeve connector fitting is non-rigid.

18. The apparatus of claim 11, wherein said sleeve connector fitting is curved.

19. The apparatus of claim 11, wherein said axial tube member and said cylindrical mesh frame member define a void, and wherein said void contains alternative filter media.

20. The apparatus of claim 19, wherein said alternative filter media is chosen from the group of filter media consisting of particulate matter, gravel and oil absorbent material.

* * * * *